United States Patent [19]

Ishida et al.

[11] Patent Number: 5,557,356
[45] Date of Patent: Sep. 17, 1996

[54] LENS-FITTED PHOTOGRAPHIC FILM UNIT

[75] Inventors: Ken Ishida; Yaichi Iijima, both of Hino, Japan

[73] Assignee: Konica Corporation, Tokyo, Japan

[21] Appl. No.: 525,031

[22] Filed: Sep. 8, 1995

[30] Foreign Application Priority Data

Sep. 13, 1994 [JP] Japan .................................. 6-218946

[51] Int. Cl.$^6$ .................................................. G03B 15/05
[52] U.S. Cl. .................. 354/149.11; 354/127.12; 354/288
[58] Field of Search ................. 354/149.11, 127.11, 354/127.12, 288

[56] References Cited

U.S. PATENT DOCUMENTS 5,016,038  5/1991  Kobayashi et al. ............... 354/127.11
5,353,079  10/1994  Sakai et al. ...................... 354/149.11

*Primary Examiner*—A. A. Mathews
*Attorney, Agent, or Firm*—Finnegan, Henderson, Farabow, Garrett & Dunner, L.L.P.

[57] ABSTRACT

A lens-fitted photographic film unit includes an electronic flash provided therein, a neon lamp to light or flicker when a charging voltage for the electronic flash reaches a predetermined value. A first window is provided on the upper surface or the rear surface of an external member of the film unit through which a light emitted from the neon lamp is observed, and a second window is further provided on the front surface of the external member through which the light emitted from the neon lamp is irradiated toward an object to be photographed. The film unit further includes a condenser lens provided between the second window and the neon lamp, to converge the light emitted from the neon lamp.

2 Claims, 1 Drawing Sheet

LENS-FITTED PHOTOGRAPHIC FILM UNIT

BACKGROUND OF THE INVENTION

The present invention relates to a lens-fitted photographic film unit in which an electronic flash is accommodated.

In a lens-fitted photographic film unit in which an electronic flash is accommodated, when the size of the film unit is intended to be reduced, the distance between the optical axis of a photographic lens and the optical axis of an electronic flash light emitting section should be reduced, resulting in the common occurrence of the pink-eye effect. As a countermeasure for decreasing the pink-eye effect, the following methods are conventionally known: a mechanical countermeasure in which an electronic flash pops up so that the distance between the two optical axes is greater; and an electrical countermeasure in which an electronic flash light is pre-emitted before photographing onto the subject person so that the eye pupils become smaller.

However, in both the mechanical countermeasure and the electrical countermeasure, the structure of the lens-fitted photographic film unit becomes more complex, and the number of parts of the film unit increases, resulting in an increase of the product's cost. Accordingly, setting aside the matter of ordinary cameras, it is difficult to apply the above countermeasures to these low cost lens-fitted photographic film units.

SUMMARY OF THE INVENTION

In view of the foregoing problems, the objective of the present invention is to propose a lens-fitted photographic film unit in which the structure is very simple and the pinkeye effect is minimized.

The above-described problems can be solved by the lens-fitted photographic film unit of the present invention which comprises: an electronic flash accommodated in the film unit; a neon lamp activating or flickering when a charging voltage reaches a predetermined value; a first window provided on the upper surface or the back surface of an outer cover member for observing the neon lamp; a second window for emitting the light of the neon lamp onto the photographic subject, the second window being provided on the front surface of the outer cover member; and a condenser lens for collecting the light of the neon lamp, the condenser lens being provided between the neon lamp and the second window.

DETAILED DESCRIPTION OF THE PREFERRED EMBODIMENT

Figure 1:
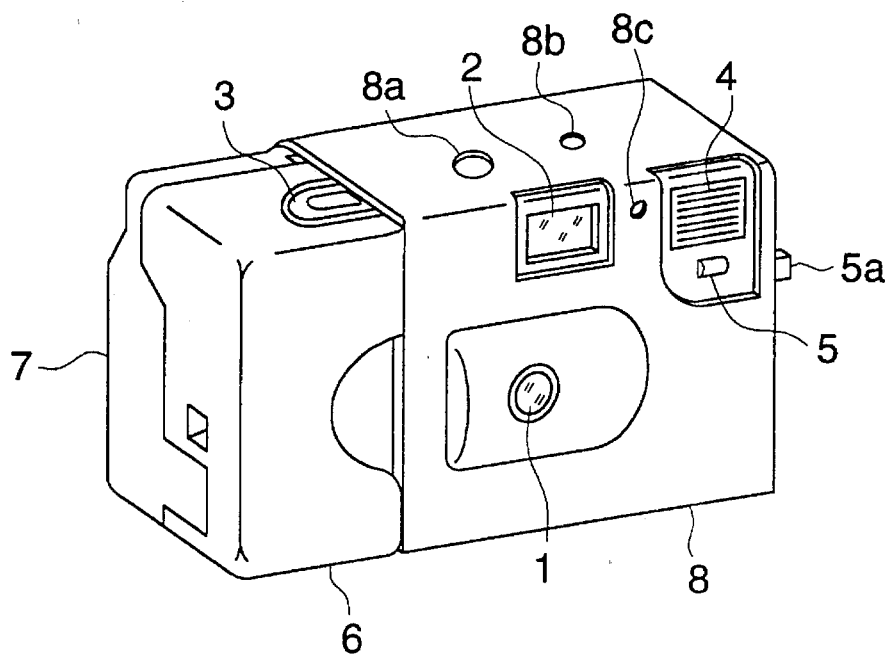
FIG. 1 is a perspective view of a lens-fitted photographic film unit.
Figure 2:
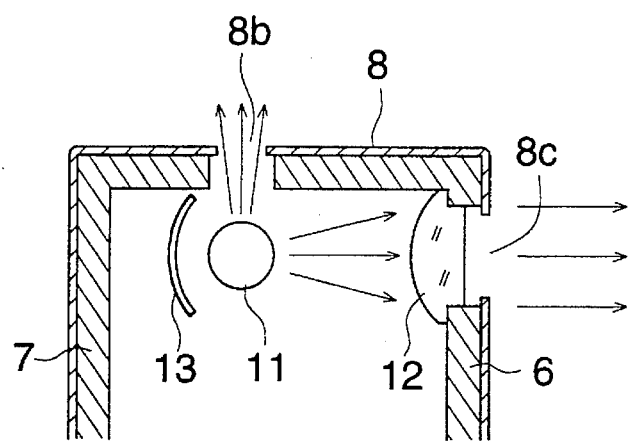
FIG. 2 is a sectional view of a neon lamp, a first window and a second window.

Referring to FIG. 1 and FIG. 2, an example of a lens-fitted photographic film unit of the present invention will be described in detail below.

FIG. 1 is a perspective view of the lens-fitted photographic film unit.

Numeral 1 is a photographic lens, numeral 2 is a finder, and numeral 3 is a release button. Numeral 4 is an electronic flash light emitting section, numeral 5 is an electronic flash operation lever, numeral 6 is a front cover, and numeral 7 is a rear cover. A large portion of the front cover 6 and the rear cover 7 of an outer cover member, is covered with a paper board cover 8, which is also an outer cover member, formed of cardboard. Openings are provided in the paper board cover 8 for the photographic lens 1, the finder 2, the electronic flash light emitting section 4 and the electronic flash operation lever 5. Further, a counter window 8a, and a first window 8b for observing a neon lamp activating or flickering when a charging voltage for the electronic flash reaches a predetermined value, are provided on the upper surface of the outer cover, and a second window 8c, which will be described later, is provided on the front surface of the outer cover.

When the strobe unit operation lever 5 is slid to the right, a switch for the strobe, not shown in the drawings, is activated and charging is started. One end 5a of the electronic flash operation lever 5 projects outside of the electronic flash so that the switch operation can be positively checked, and the operation status of the electronic flash operation lever 5 can also be judged from any portion other than the front surface.

FIG. 2 is a sectional view of the neon lamp and each of the two windows.

As described above, when the electronic flash operation lever 5 is moved to the right, charging starts, and when the charging voltage reaches a predetermined value, the neon lamp 11 is activated or flickers. This activation or flicker of the neon lamp 11 is determined by the composition of the electronic flash circuit, not shown in the drawings. In any case, since the neon lamp 11 is inactivated until charging has been completed, the photographer can visually confirm the charging status through the first window 8b.

The second window 8c is formed by providing an opening on the front surface of the front cover 6 and also on the paper board cover 8. A condenser lens 12 for collecting the light of the neon lamp 11 is provided between the second window 8c and the neon lamp 11. Accordingly, when the neon lamp 11 is activated or flickers after charging has been completed, the light from the neon lamp is collected by the condenser lens 12, and emitted onto eyes of the subject person, which is the photographic subject. The pupils of the person irradiated by the light become smaller. Therefore, even when the distance between the optical axis of the photographing lens 1 and the optical axis of the electronic flash light emitting section 4 is short, the pink-eye effect is reduced when the release button 3 is pressed for the actual photograph, after emitting the electronic flash light. Further, in order to effectively emit the light of the neon lamp 11 onto the photographic subject, a reflection mirror 13 may be located at the rear of the neon lamp 11 so that the light emitting toward the back portion can also be emitted forward.

In this connection, if the reflection mirror 13 is not used, the first window 8b can be provided on the rear surface, instead of the upper surface, of the outer cover.

According to the above-described embodiment, the pink-eye effect can be reduced by a rather simple structure. Accordingly, the present invention can be easily used for even a low cost lens-fitted photographic film unit.

Further, the pink-eye effect can be more assuredly reduced by the present invention.

What is claimed is:

1. A lens-fitted photographic film unit comprising:
   (a) an electronic flash provided inside the film unit;
   (b) a neon lamp provided inside the film unit, for lighting or flickering when a charging voltage for the electronic flash reaches a predetermined value;
   (c) an external member having a first window provided a part of the external member through which a light emitted from the neon lamp is observed, and a second window provided on a front surface of the external member through which the light emitted from the neon lamp is irradiated toward an object to be photographed; and (d) a condenser lens provided between the second window and the neon lamp, for converging the light emitted from the neon lamp.

2. The lens-fitted photographic film unit according to claim 1, further comprising a reflecting mirror provided on a rear side of the neon lamp inside the film unit, for reflecting the light emitted from the neon lamp.

* * * * *